R. KETCHUM.
Mower.
No. 28,283.
Patented May 15, 1860.
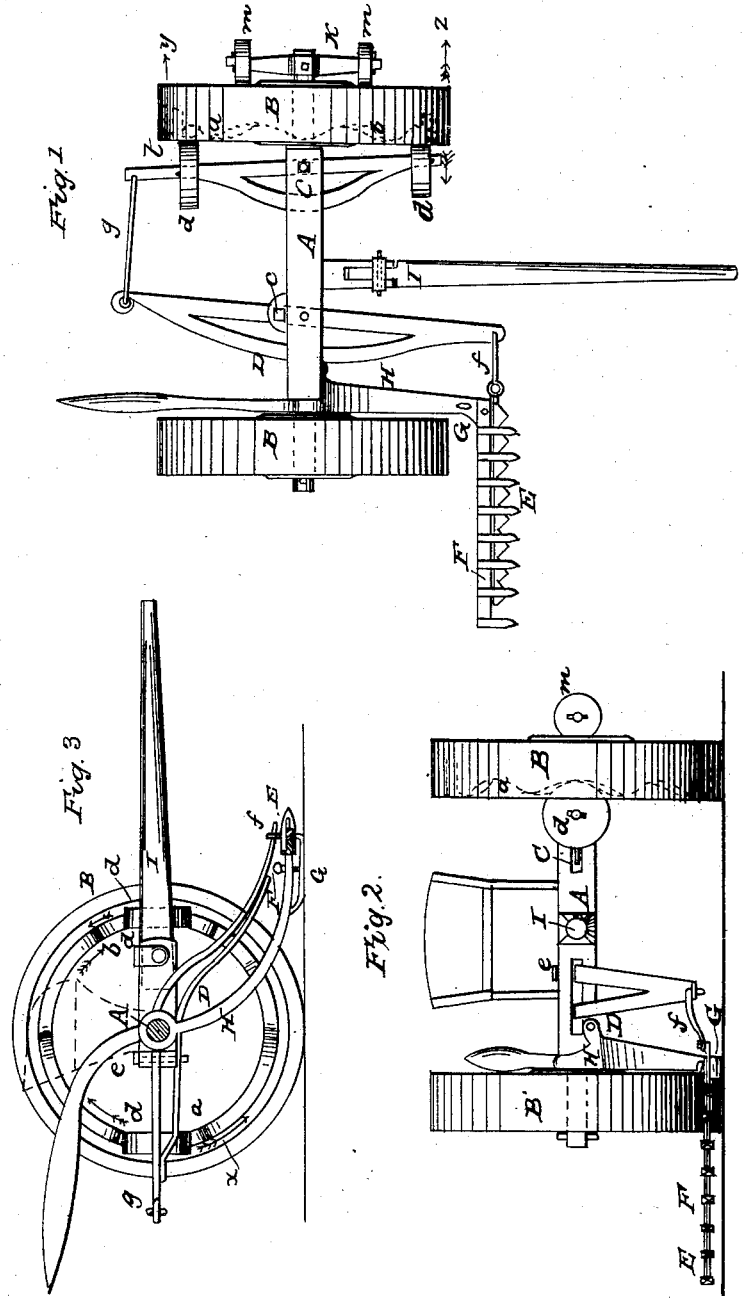
WITNESSES
INVENTOR
Richard Ketchum

UNITED STATES PATENT OFFICE.

RICHARD KETCHAM, OF SOUTH DANSVILLE, NEW YORK.

IMPROVEMENT IN MOWING AND REAPING MACHINES.

Specification forming part of Letters Patent No. 28,283, dated May 15, 1860.

*To all whom it may concern:*

Be it known that I, RICHARD KETCHAM, of South Dansville, in the county of Steuben and State of New York, have invented a certain new and useful Improvement on Mowing and Reaping Machines, of which the following, taken in connection with the accompanying drawings, is such a full and clear description as that it will enable others skilled in the building and working of mowing and reaping machines to make and use the same—

Figure 1 of said drawings representing a plan view of my improvement applied to a mowing-machine; Fig. 2, a front view of the same, and Fig. 3 a side elevation thereof.

Referring to the accompanying drawings, the portion marked A represents the axle of the vehicle.

B B' are the running-wheels, arranged at a suitable distance apart and freely rotating on or round the axle. The one, B, of these wheels has on its inner face corrugations $a\,b$, which, as the wheel rotates during or by the travel of the vehicle, serve to operate a rocking beam or lever, C, that has its fulcrum $c$ on the axle of the vehicle, and that carries, on opposite sides of the axle, rollers $d\,d$, which gear with and are alternately acted upon by the corrugations of the running-wheel B.

D is a second rocking beam or lever, having its fulcrum $e$ also on or connected with the axle, either at a fixed point or at a variable one, so as to lessen or increase the stroke at the forward end of the lever, which end serves to actuate the cutter E by means of a hook-rod, $f$, connecting said end with the cutter, a similar rod, $g$, uniting the two rocking levers C and D and serving to make the first-mentioned lever drive the last-named one. When it is not desired to reciprocate the cutter either of these rods $f$ or $g$ may be unhooked at its one end to break the connection.

The finger-bar F, with its fingers, cutter E, and sustaining-shoe G, are all carried by an arm or lever, H, made fast to the axle of the vehicle, and preferably arranged to cross the axle and extend in rear thereof, whereby the driver from his seat may by a convenient movement of his hand raise the cutter and its immediate appurtenances by rocking the axle so as to clear or ride over any obstacle on the ground—as, for instance, a stone in the way of the cutter.

The draft-pole I has a jointed connection with the axle to facilitate the rocking of the latter when raising and lowering the cutter.

To remove an objection which is ordinarily applicable to corrugated driving-wheel actions of this character, and which might interfere with the perfect operation of the combination I have here described, I provide the axle outside of the driving-wheel with a cross-bar, K, or its equivalent, carrying on either side of the axle and at a suitable distance from it supporting-rollers $m\,m$ to the outside face of said wheel. These rollers $m\,m$ should lie in the same plane, or thereabout, as the operating-rollers $d\,d$, and are designed to work in connection with the latter to keep the driving-wheel B from "wabbling," so that its corrugations $a\,b$ will at all times gear regularly and evenly with the operating-rollers $d\,d$, which prevents "binding."

The importance of the supporting-rollers $m\,m$ will be seen from the consideration of the fact that the resistance presented by the operating-rollers $d\,d$ against the driving-wheel B is alternately on opposite side of the wheel's axis and at a considerable distance therefrom, which of course superinduces wabbling or alternate twist of the wheel in reverse directions, as indicated by the arrows $y\,z$ and $y\,z$ in Fig. 1; also, the like effect is apt to be produced by the unevenness of the ground. But it is the effect of the operating-rollers $d\,d$ alternately on opposite sides of the wheel's axis that special attention is here called to, and the irregularity and binding which such is apt to produce on or in the wheel's gear with the operating-rollers, and it would not only occasion great friction (which is here obviated) to enlarge the diameter of the driving-wheels on the axle to restrain the wheel from wabbling, but such, entirely, is impossible and inconsistent with a free and easy run of the wheel on the axle. As both the operating-rollers $d\,d$ and supporting-rollers $m\,m$ are connected with the axle, which is the center of motion to the driving-wheel, their proper actions and positions in relation to each other and the driving-wheel are necessarily preserved, and in rocking the axle the supporting-rollers $m\,m$ move to face the lever C, which carries the operating-rollers.

What is claimed here as new is—

The combination of the cross-bar K, having supporting-rollers *m m*, and vibrating bar or beam C, furnished with rollers *d d* for operation by the corrugated driving-wheel B, all arranged upon the axle A for actuating the cutter, substantially in the manner and for the purposes set forth.

In testimony whereof I have hereunto subscribed my name.

RICHARD KETCHAM.

Witnesses:
A. ADAMSON,
A. GREGORY.